United States Patent
Tolopka et al.

(10) Patent No.: US 9,430,296 B2
(45) Date of Patent: *Aug. 30, 2016

(54) SYSTEM PARTITIONING TO PRESENT SOFTWARE AS PLATFORM LEVEL FUNCTIONALITY VIA INTER-PARTITION BRIDGE INCLUDING REVERSIBLE MODE LOGIC TO SWITCH BETWEEN INITIALIZATION, CONFIGURATION, AND EXECUTION MODE

(71) Applicant: Intel Corporation, Santa Clara, CA (US)

(72) Inventors: Stephen J. Tolopka, Portland, OR (US); David A. Koufaty, Portland, OR (US); John I. Garney, Portland, OR (US); Yasser Rasheed, Beaverton, OR (US); Ulhas Warrier, Beaverton, OR (US); Matthew Hoekstra, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 441 days.

This patent is subject to a terminal disclaimer.

(21) Appl. No.: 13/918,277

(22) Filed: Jun. 14, 2013

(65) Prior Publication Data

US 2013/0290978 A1 Oct. 31, 2013

Related U.S. Application Data

(63) Continuation of application No. 11/694,276, filed on Mar. 30, 2007, now Pat. No. 8,479,208.

(51) Int. Cl.
| | | |
|---|---|---|
| G06F 9/50 | (2006.01) | |
| G06F 21/74 | (2013.01) | |
| G06F 9/445 | (2006.01) | |
| G06F 9/455 | (2006.01) | |
| G06F 12/10 | (2016.01) | |
| G06F 12/14 | (2006.01) | |

(52) U.S. Cl.
CPC .............. *G06F 9/5077* (2013.01); *G06F 21/74* (2013.01); *G06F 8/65* (2013.01); *G06F 9/45533* (2013.01); *G06F 9/45558* (2013.01); *G06F 12/109* (2013.01); *G06F 12/1491* (2013.01)

(58) Field of Classification Search
None
See application file for complete search history.

(56) References Cited

U.S. PATENT DOCUMENTS

| | | |
|---|---|---|
| 3,641,505 A | 2/1972 | Artz et al. |
| 4,843,541 A | 6/1989 | Bean |
| 5,369,749 A | 11/1994 | Baker |
| 6,314,501 B1 | 11/2001 | Gulick |
| 7,509,644 B2 | 3/2009 | Worley |

(Continued)

OTHER PUBLICATIONS

Sailer et al, sHype: secure Hypervisor Approach to Trusted Virtualized System, 2005, IBM Research Report, pp. 1-13.*

*Primary Examiner* — Abu Ghaffari
(74) *Attorney, Agent, or Firm* — Trop, Pruner & Hu, P.C.

(57) ABSTRACT

Embodiments of apparatuses, methods for partitioning systems, and partitionable and partitioned systems are disclosed. In one embodiment, a system includes processors and a partition manager. The partition manager is to allocate a subset of the processors to a first partition and another subset of the processors to a second partition. The first partition is to execute first operating system level software and the second partition is to execute second operating system level software.

16 Claims, 3 Drawing Sheets

(56) References Cited

U.S. PATENT DOCUMENTS

| | | |
|---|---|---|
| 7,640,426 B2 | 12/2009 | Garney |
| 7,689,800 B2 | 3/2010 | Oshins |
| 7,802,081 B2 | 9/2010 | Schultz |
| 7,987,464 B2 | 7/2011 | Day |
| 8,612,971 B1* | 12/2013 | Fitzgerald ........... G06F 9/45533 718/1 |
| 2003/0037178 A1 | 2/2003 | Vessey |
| 2004/0215939 A1* | 10/2004 | Armstrong et al. .......... 712/220 |
| 2005/0091476 A1* | 4/2005 | Doing ................... G06F 9/3804 712/227 |
| 2005/0097345 A1* | 5/2005 | Kelley .................... G06F 9/468 726/6 |
| 2005/0188064 A1* | 8/2005 | Schoinas ....................... 709/221 |
| 2005/0289283 A1* | 12/2005 | Warrier .................... G06F 21/53 711/1 |
| 2006/0020944 A1* | 1/2006 | King ................... G06F 9/45541 718/104 |
| 2006/0206887 A1* | 9/2006 | Dodge et al. ................. 717/161 |
| 2006/0236127 A1* | 10/2006 | Kurien et al. ................. 713/193 |
| 2008/0126747 A1 | 5/2008 | Griffen |
| 2008/0162827 A1 | 7/2008 | Schultz |

\* cited by examiner

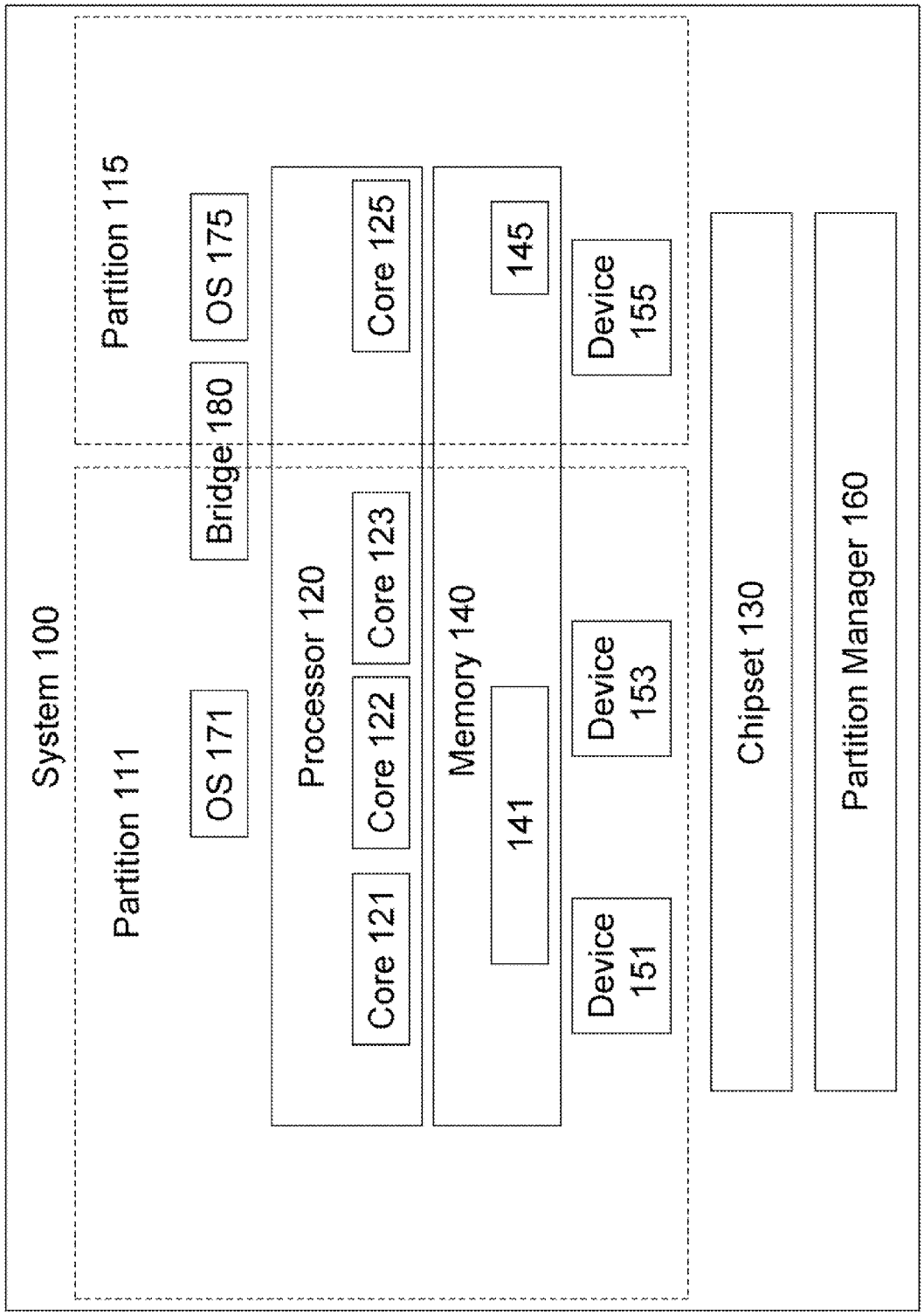

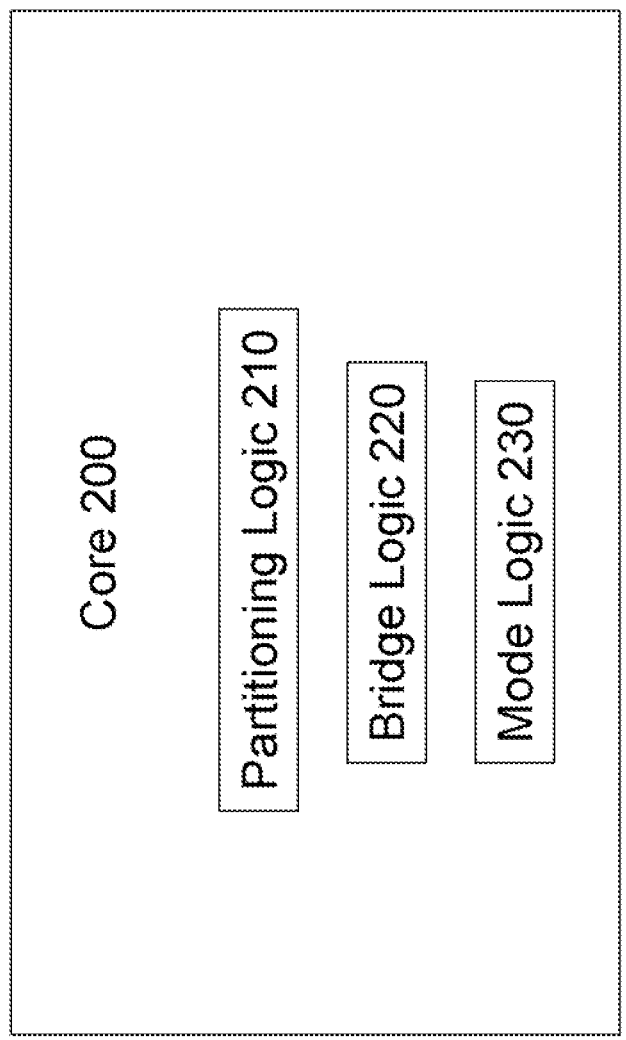

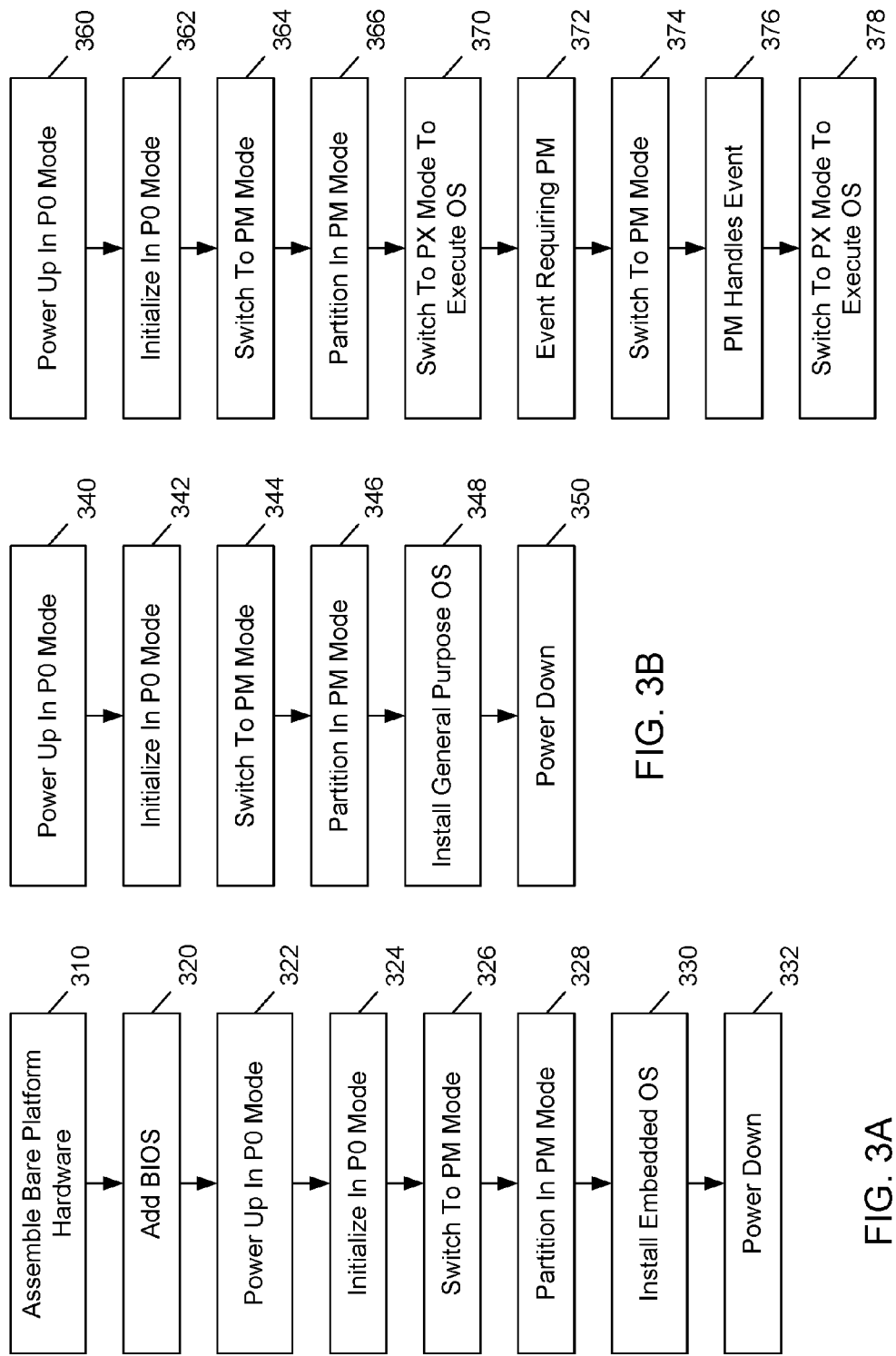

SYSTEM PARTITIONING TO PRESENT SOFTWARE AS PLATFORM LEVEL FUNCTIONALITY VIA INTER-PARTITION BRIDGE INCLUDING REVERSIBLE MODE LOGIC TO SWITCH BETWEEN INITIALIZATION, CONFIGURATION, AND EXECUTION MODE

This application is a continuation of U.S. patent application Ser. No. 11/694,276, filed Mar. 30, 2007, the content of which is hereby incorporated by reference.

BACKGROUND

1. Field

The present disclosure pertains to the field of information processing, and more particularly, to the field of partitioning information processing systems.

2. Description of Related Art

Generally, the concept of partitioning in information processing systems refers to dividing a system into partitions, where each partition is a group of system resources that may be operated as a complete and independent system. The system resources that may be allocated to a partition include processors, processor cores (where individual cores of a multicore processor may be allocated to different partitions), portions of system memory, and input/output ("I/O") and other peripheral devices. Different types of partitioning are known.

In "soft" partitioning, system resources may be shared between partitions. One form of soft partitioning is virtualization, which allows multiple instances of one or more operating systems (each, an "OS") to run on a single system, even though each OS is designed to have complete, direct control over the system and its resources. Soft partitioning typically requires using a single virtual machine monitor or hypervisor to directly control the whole system, enforce the sharing of system resources, and present an abstraction of a complete, unshared system to any other such software or OS running on the system.

In "hard" partitioning, each system resource is typically dedicated to a respective partition. Hard partitioning provides for any OS, virtual machine monitor, hypervisor, or other such software to be run in each partition and directly control the system resources of its partition.

BRIEF DESCRIPTION OF THE FIGURES

The present invention is illustrated by way of example and not limitation in the accompanying figures.

FIG. 1 illustrates an embodiment of the present invention in a partitioned information processing system.

FIG. 2 illustrates an embodiment of the present invention in a processor.

FIGS. 3A-3C illustrate an embodiment of the present invention in a method for partitioning an information processing system.

DETAILED DESCRIPTION

The present invention may be embodied in apparatuses, methods for partitioning systems, and partitionable and partitioned systems as described below. In this description, numerous specific details, such as component and system configurations, may be set forth in order to provide a more thorough understanding of the present invention. It will be appreciated, however, by one skilled in the art, that the invention may be practiced without such specific details. Additionally, some well known structures, circuits, and the like have not been shown in detail, to avoid unnecessarily obscuring the present invention.

Elements of embodiments of the invention may be implemented in hardware, software, firmware, or any combination of hardware, software, or firmware. The term hardware generally refers to an element having a physical structure such as electronic, electromagnetic, optical, electro-optical, mechanical, electro-mechanical parts, etc. The term software generally refers to a logical structure, a method, a procedure, a program, a routine, a process, an algorithm, a formula, an expression, etc. The term firmware generally refers to a logical structure, a method, a procedure, a program, a routine, a process, an algorithm, a formula, or expression that is implemented or embodied in a hardware structure (e.g., flash memory or read only memory). Examples of firmware are microcode, writable control store, and micro-programmed structure.

FIG. 1 illustrates an embodiment of the present invention in partitioned information processing system 100. Information processing system 100 may be personal computer, a mainframe computer, a portable computer, a handheld device, a set-top box, a server, or any other computing system. In this embodiment, system 100 includes one or more processor packages 120, chipset(s) 130, system memory 140, and devices 151, 153, and 155.

Processor 120 may be any component having one or more execution cores, where each execution core may be based on any of a variety of different types of processors, including a general purpose microprocessor, such as a processor in the Intel® Pentium® Processor Family, Itanium® Processor Family, or other processor family from Intel® Corporation, or another processor from another company, or a digital signal processor or microcontroller, or may be a reconfigurable core (e.g. a field programmable gate array). Although FIG. 1 shows only one such processor 120, system 100 may include any number of processors, including any number of multicore processors, each with any number of execution cores, and any number of multithreaded processors, each with any number of threads. In this embodiment, processor 120 includes cores 121, 122, 123, and 125.

Chipset 130 may be any group of circuits and logic that supports memory operations, input/output operations, configuration, control, internal or external interface, connection, or communications functions (e.g., "glue" logic and bus bridges), and/or any similar functions for processor 120 and/or system 100. Individual elements of chipset 130 may be grouped together on a single chip, a pair of chips, dispersed among multiple chips, and/or be integrated partially, totally, redundantly, or according to a distributed approach into any one or more processors, including processor 120.

System memory 140 may be any medium on which information, such as data and/or program code, may be stored, such as static or dynamic random access memory, semiconductor-based read-only or flash memory, magnetic or optical disk memory, or any other type of medium readable by processor 120, or any combination of such mediums.

Devices 151, 153, and 155 may each represent any number of any type of I/O, peripheral, or other devices, such as a keyboard, mouse, trackball, pointing device, monitor, printer, media card, network interface, information storage device, etc. Each of devices 151, 153, and 155 may be embodied in a discrete component, or any one or more of them may be included in an integrated component with any other devices. In one embodiment, devices 151, 153, and 155 may each represent a different function in a multifunctional I/O, peripheral, or other device.

Processor 120, chipset 130, system memory 140, and devices 151, 153, and 155 may be coupled to or communicate with each other according to any known approach, such as directly or indirectly through one or more parallel, sequential, pipelined, asynchronous, synchronous, wired, wireless, or other bus or point-to-point connection. System 100 may also include any number of additional devices, agents, components, or connections.

System 100 also includes partition manager 160. Partition manager 160 may be any firmware or software to support the partitioning of system 100. Partition manager 160 may be executed at the time of system initialization to configure the system into any number of partitions, or containers, by allocating a first subset of system resources to a first partition, a second subset of system resources to a second partition, etc. The allocation is performed to isolate partitions from each other. For example, only the software running in a partition may directly access the hardware resources of that partition. The allocation and isolation may be performed according to any known techniques, such as the use of memory range registers to allocate portions of memory to partitions, and the use of device access maps to allocate devices to partitions.

Partition manager 160 may also be used to configure and manage bridges between partitions (each, an "inter-partition bridge" or "IPB"). An IPB may be any interface between two partitions, where the partition manager allows communication between the two partitions only through the IPB. The partition manager configures and manages each IPB according to the functionality that each partition presents to the other partitions. For example, a partition may be configured and managed to provide the functionality of an add-in peripheral card, any or other hardware or embedded device, to a system. In that case, the partition manager configures and manages an IPB to emulate an interface to that partition, or otherwise provide access to that partition, according to the same protocol that the actual add-in card or other device would use.

Therefore, system 100 may be partitioned into partitions 111 and 115. Core 121, 122, and 123 of multicore processor 120, portion 141 of system memory 140, and devices 151 and 153 may be allocated to partition 111. Core 125 of multicore processor 120, portion 145 of system memory 140, and device 155 may be allocated to partition 115. Each partition may also include additional processors, cores, portions of memory, devices, or any other physical resources described above or otherwise known in the art of information processing.

FIG. 1 also shows OS 171 installed to be executed in partition 111, and OS 175 installed to be executed in partition 115. OS 171 may be any software or firmware, such as a general purpose OS, a VMM, a hypervisor, an embedded OS, or a real-time OS, to control and manage the system resources that have been allocated to partition 111. Any number of other software programs, such as application programs, may also be installed to be executed in partition 111. Similarly, OS 175 may be any software or firmware to control and manage the resources of partition 115, and any number of other software programs may also be installed to be executed in partition 115. Except as described below, none of the software installed to be executed in partition 111 can access any of the resources in partition 115, and none of the software installed to be executed in partition 115 can access any of the resources in partition 111. This isolation between partitions is implemented by partition manager 160, as described above.

In FIG. 1, bridge 180 represents an IPB between partitions 111 and 115. Bridge 180 is configured and maintained by partition manager 160 to provide for partition 111 to recognize and communicate with partition 115 as the device or functionality that partition 115, including the software installed to execute on partition 115, has been configured to emulate or provide, and/or vice versa (i.e., partition 115 recognizes and communicates with partition 111 as the device or functionality that partition 111 has been configured to execute or provide).

In one embodiment, OS 171 may be a VMM, in direct control of cores 121, 122, and 123, portion 141 of system memory 140, and devices 151 and 153, and supporting one or more virtual machines. OS 175 may be an embedded OS, in direct control of core 125, portion 145 of system memory 140, and device 155, and managing these resources as an embedded system. Partition manager 160 may configure and maintain bridge 180 to present partition 115 to OS 171 as platform level functionality, as if the physical resources allocated to partition 115, along with the software installed to execute on partition 115, were a unified, dedicated, self-contained platform resource such as an add-in card. For example, partition 115 may be configured by partition manager 160 and managed by OS 175 to provide the functionality of a network interface card, a redundant array of independent drives controller, a location device (e.g., including global positioning system functionality and radio or other wireless networking or communication functionality), a cable or other content provider's converter or decoder, or a media appliance, or to provide platform level services such as system power management, fault prediction, or load balancing. In other embodiments, a single partition may be configured and loaded with software to provide multiple functionalities.

The partitioning of a system as described above may be desired so that OS 175 or any other software installed to execute on partition 115 is not recognized by OS 171, or any other general purpose OS installed to run on system 100, as software. None of the hardware or software of partition 115 is separately accessible or recognizable to software running on another partitions, rather, it appears only through bridge 180 as a unified hardware or embedded device. Therefore, a bare platform, including only the hardware and firmware of system 100, may be provided by a system manufacturer. The bare platform may be customized, either by the system manufacturer or a reseller, by partitioning the system as shown in FIG. 1, installing OS 175 to manage partition 115 to implement, emulate, or otherwise provide a specific platform level functionality. A subsequent reseller or an end user may then install OS 171 on partition 111, without compromising the security, reliability, manageability, or control of the functionality provided by partition 115.

FIG. 2 illustrates processor core 200, according to one embodiment of the present invention. Processor core 200 may represent any one or more of cores 121, 122, 123, and 125 of FIG. 1, or any other core in an embodiment of the invention. Processor core 200 includes partitioning logic 210, bridge logic 220, and mode logic 230. Although FIG. 2 illustrates partitioning logic 210 and bridge logic 220 as being included in processor core 200, partitioning logic 210 and bridge logic 220 may be completely, partially, or redundantly included elsewhere in a system, such as in a processor outside an execution core, in a memory controller, or in a chipset.

Partitioning logic 210 may include any circuitry, structure, or logic to support the partitioning of a system. For example, partitioning logic 210 may include memory range registers or other storage locations that may each store a lower address, and upper address, and/or an offset address that defines a portion of system memory to be allocated a particular partition. Partitioning logic 210 may also include a storage location to store an access control list, map, or other data structure that may be used to restrict each device to issuing and/or responding to transactions within a particular portion of memory that is assigned to a particular partition, or to otherwise directly or indirectly allocate each device to a particular partition. A device may be identified in such an access control list, map, or other data structure with any unique identifier, such as a bus, device, function number ("BDF") that identifies the device according to its particular function within a particular device on a particular bus in the system. Partitioning logic 210 may also include logic to decode and execute instructions to configure or manage system partitioning.

Bridge logic 220 may include any circuitry, structure, or logic to support the configuration and maintenance of one or more IPBs. For example, bridge logic 220 may include registers or other storage locations to store memory, I/O, or other addresses that are allocated to serve as addresses at which partitions are to be accessed through IPBs, logic to recognize and intercept transactions to these addresses, and logic to decode, convert, or translate these transactions to be received and/or responded to by the appropriate partition. Bridge logic 220 may also include logic to decode and execute instructions to configure or manage IPBs or to transfer information through IPBs.

Mode logic 230 may include any circuitry, structure, or logic to provide the ability for processor core 200 to operate in separate modes. For example, mode logic 230 may be implemented in microcode, programmable logic, hard-coded logic, or any other form of logic within processor core 200. Mode logic 230 may include control logic to cause processor core 200 to switch modes based on certain conditions, such as the execution or attempts to execute certain instructions, as described below in reference to FIGS. 3A-3C.

In one embodiment, processor core 200 may operate in two modes. In a first mode ("PX mode"), partitioning logic 210 and bridge logic 220 are not accessible or configurable, but are enabled to maintain and enforce partitioning.

In a second mode ("PM mode"), partitioning logic 210 and bridge logic 220 are accessible and configurable by software or firmware running on processor core 200. For example, where special instructions are provided to configure partitioning registers, partitioning logic, IPB registers, or IPB logic, or to transfer information across an IPB, these instructions may only be executed while processor core 200 is in PM mode. Attempts to execute these instructions outside of PM mode may result in a fault or exception. In PM mode, processor 200 may be able to initiate special transactions to configure partitioning registers, logic, or other resources outside of processor 200, such as in a chipset.

In another embodiment, a third mode ("P0 mode") may be available. In P0 mode, partitioning logic 210 and bridge logic 220 are not accessible or configurable, and is also not enabled to maintain and enforce partitioning. In P0 mode, special instructions may be recognized and executed to request partitioning services, such as instructions to request the creation of partitions. Attempts to execute these instructions outside of P0 mode may result in a fault or exception.

Mode logic 230 may include control or other logic that provides for different results from the execution of certain instructions depending on the mode. For example, in a system where the cache of a processor may be partitioned, the CPUID instruction according to the architecture of the Pentium® Processor Family may, in P0 mode, report the full cache size of a processor, but, in PX mode, a smaller cache size corresponding to the portion of the cache allocated to a particular partition.

FIGS. 3A-3C illustrate an embodiment of the present invention in method 300, a method for partitioning an information processing system. Although method embodiments are not limited in this respect, reference may be made to the description of system 100 of FIG. 1 and processor core 200 of FIG. 2 to describe the method embodiment of FIGS. 3A-3C.

In box 310 of FIG. 3A, the bare platform hardware, including a partition manager, of an information processing system, e.g., system 100, is assembled. In one embodiment, box 310 may be performed by a system manufacturer.

In box 320, a basic I/O system ("BIOS") is added, which may include instructions to request a partitioning of the system into a general purpose partition, e.g., partition 111, and a special purpose partition, e.g., partition 115. In box 322, the system is powered up. A processor core in the system, e.g., processor core 200, is designed to begin to operate, upon being powered up and/or coming out of reset, in P0 mode. In box 324, initialization instructions from the BIOS, including instructions to request partitioning, are executed by processor core 200. In box 326, in response to the execution of an instruction requesting partitioning, processor 200 switches into PM mode and the partition manager begins to execute. In box 328, the partition manager partitions the system into general purpose partition 111 and special purpose partition 115.

In box 330, special purpose software, such as an embedded OS, is installed to execute in partition 115. In box 332, the system is powered down. In one embodiment, boxes 320 through 332 may be performed by or under the control of the system manufacturer or a value added reseller.

In box 340, the system is powered up. In box 342, initialization instructions from the BIOS, including instructions to request partitioning, are executed by processor core 200 in P0 mode. In box 344, in response to the execution of an instruction requesting partitioning, processor 200 switches into PM mode and the partition manager begins to execute. In box 346, the partition manager partitions the system into general purpose partition 111 and special purpose partition 115. In box 348, a general purpose OS is installed to execute in partition 111. In box 350, the system is powered down. In one embodiment, boxes 340 through 350 may be performed by or under the control of the system manufacturer, a value added reseller, a different reseller, or an end user.

In box 360, the system is powered up. In one embodiment, steps 360 and higher are performed by or under the control of an end user. In box 362, initialization instructions from the BIOS, including instructions to request partitioning, are executed by processor core 200 in P0 mode. In box 364, in response to the execution of an instruction requesting partitioning, processor 200 switches into PM mode and the partition manager begins to execute. In box 366, the partition manager partitions the system into general purpose partition 111 and special purpose partition 115.

In box 370, the partition manager transfers control of processor 200 to the OS installed in the partition to which processor 200 has been allocated. This transfer of control includes processor 200 switching into PX mode. In box 372, an event occurs that requires handling by the partition manager, such as the execution of an instruction by the OS or other software running on processor 200 involving a transaction across an IPB. In box 374, in response to the event referred to in box 372, processor 200 switches into PM mode. In box 376, the partition manager handles the event. In box 378, processor 200 switches back into PX mode and returns to executing the OS or other installed software.

Within the scope of the present invention, it may be possible for method 300 to be performed with illustrated boxes omitted, with additional boxes added, or with a combination of reordered, omitted, or additional boxes. For example, in one embodiment, a core in a system may be dedicated to executing the partition manager, in which case the core may always operate in PM mode and may or may not support or switch into any other modes. In this or another embodiment, other cores may or may not support or switch into PM mode.

Any component or portion of a component designed according to an embodiment of the present invention, such as processor 200, may be designed in various stages, from creation to simulation to fabrication. Data representing a design may represent the design in a number of manners. First, as is useful in simulations, the hardware may be represented using a hardware description language or another functional description language. Additionally or alternatively, a circuit level model with logic and/or transistor gates may be produced at some stages of the design process. Furthermore, most designs, at some stage, reach a level where they may be modeled with data representing the physical placement of various devices. In the case where conventional semiconductor fabrication techniques are used, the data representing the device placement model may be the data specifying the presence or absence of various features on different mask layers for masks used to produce an integrated circuit.

In any representation of the design, the data may be stored in any form of a machine-readable medium. An optical or electrical wave modulated or otherwise generated to transmit such information, a memory, or a magnetic or optical storage medium, such as a disc, may be the machine-readable medium. Any of these media may "carry" or "indicate" the design, or other information used in an embodiment of the present invention. When an electrical carrier wave indicating or carrying the information is transmitted, to the extent that copying, buffering, or re-transmission of the electrical signal is performed, a new copy is made. Thus, the actions of a communication provider or a network provider may constitute the making of copies of an article, e.g., a carrier wave, embodying techniques of the present invention.

Thus, system, apparatus, and method embodiments of the invention have been disclosed. While certain embodiments have been described, and shown in the accompanying drawings, it is to be understood that such embodiments are merely illustrative and not restrictive of the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A system comprising:
a plurality of processors;
a partition manager to allocate a first subset of the plurality of processors to a first partition, the first partition to execute first operating system software to manage the first subset of the plurality of processors as resources individually accessible to the first operating system software, the partition manager also to allocate a second subset of the plurality of processors to a second partition, the second partition to execute second operating system software to manage the second subset of processors as resources individually accessible to the second operating system software;
wherein at least one of the plurality of processors includes:
partitioning logic to support allocation of the first subset of processors to the first partition and the allocation of the second subset of processors to the second partition; and
mode logic to reversibly switch operation of at least one of the plurality of processors between a first mode, a second mode and a third mode, wherein the partitioning logic is configurable in the second mode, the partitioning logic is not configurable in the first mode but enabled to maintain and enforce partitioning, the partitioning logic is not configurable in the third mode and not enabled to maintain and enforce partitioning, wherein the mode logic is to switch the operation from the third mode to the second mode responsive to an instruction to request partitioning, and in the second mode the system is to execute at least one of the first operating system software and the second operating system software; and
an inter-partition bridge to be managed by the partition manager, the inter-partition bridge to enable the first operating system software to access the second partition, wherein at least one of the plurality of processors includes bridge logic configurable in the second mode to support the management of the inter-partition bridge.

2. The system of claim 1, further comprising a plurality of memory regions, wherein the partition manager is to allocate a first subset of the plurality of memory regions to the first partition to be managed by the first operating system software, and to allocate a second subset of the plurality of memory regions to the second partition to be managed by the second operating system software.

3. The system of claim 1, further comprising a plurality of devices, wherein the partition manager to allocate a first subset of the plurality of devices to the first partition to be managed by the first operating system software, and to allocate a second subset of the plurality of devices to the second partition to be managed by the second operating system software.

4. The system of claim 1, wherein the first operating system software is a general purpose operating system.

5. The system of claim 1, wherein the first operating system software is a virtual machine monitor.

6. The system of claim 1, wherein the second operating system software is an embedded operating system.

7. A non-transitory machine-readable medium having stored thereon instructions, which if performed by a machine cause the machine to perform a method comprising:
switching a processor from a first mode to a second mode to partition a system, wherein the processor includes partitioning logic accessible and configurable in the second mode, the partitioning logic not accessible and configurable in the first mode;

partitioning, by the processor, the system into a first partition to execute first operating system software to manage a first plurality of resources as individually accessible to the first operating system software, and a second partition to execute second operating system software to manage a second plurality of resources as individually accessible to the second operating system software;

enforcing the partitioning of the first partition and the second partition in a third mode, wherein the partitioning logic is enabled in the third mode but is not accessible or configurable;

switching operation from the third mode to the second mode responsive to an instruction to request partitioning, and executing at least one of the first operating system software and the second operating system software in the second mode;

presenting the second partition, including the second operating system software, to the first operating system as a device implementing a specific platform level functionality; and managing an inter-partition bridge, wherein the second partition is accessible to the first operating system software via the inter-partition bridge.

8. The machine-readable medium of claim 7, wherein the partitioning includes allocating the first plurality of resources to the first partition and allocating the second plurality of resources to the second partition.

9. The machine-readable medium of claim 7, wherein the method further comprises switching the processor to the third mode to execute one of the first operating system software and the second operating system software, wherein the partitioning is enforced in the third mode.

10. The machine-readable medium of claim 9, wherein the method further comprises switching the processor from the third mode to the second mode to handle a transaction between the first partition and the second partition.

11. A processor comprising:
a plurality of cores;
a partition manager to allocate a first subset of the plurality of cores to a first partition, the first partition to execute first operating system software to manage the first subset of the plurality of cores as resources individually accessible to the first operating system software, the partition manager also to allocate a second subset of the plurality of cores to a second partition, the second partition to execute second operating system software to manage the second subset of cores as resources individually accessible to the second operating system software;

wherein at least one of the plurality of cores includes:
partitioning logic to support the allocation of the first subset of cores to the first partition and the allocation of the second subset of cores to the second partition;
mode logic to provide a second mode to execute the partition manager and a first mode to execute at least one of the first operating system software and the second operating system software and a third mode, wherein the partitioning logic is configurable in the second mode, the partitioning logic not configurable in the first mode but enabled to maintain and enforce partitioning, the partitioning logic not configurable in the third mode and not enabled to maintain and enforce partitioning; and
an inter-partition bridge to be managed by the partition manager, to enable the second partition to be accessible to the first operating system software, wherein the bridge logic is configurable in the second mode to support the management of the inter-partition bridge.

12. The processor of claim 11, wherein the partition manager is to allocate a first subset of a plurality of memory regions to the first partition to be managed by the first operating system software, and to allocate a second subset of the plurality of memory regions to the second partition to be managed by the second operating system software.

13. The processor of claim 11, a plurality of devices are coupled to the processor, wherein the partition manager to allocate a first subset of the plurality of devices to the first partition to be managed by the first operating system software, and to allocate a second subset of the plurality of devices to the second partition to be managed by the second operating system software.

14. The processor of claim 11, wherein the first operating system software is a general purpose operating system.

15. The processor of claim 11, wherein the first operating system software is a virtual machine monitor.

16. The processor of claim 11, wherein the second operating system software is an embedded operating system.

* * * * *